US012489335B2

(12) United States Patent
Crosby et al.

(10) Patent No.: US 12,489,335 B2
(45) Date of Patent: Dec. 2, 2025

(54) POWER TOOL WITH ENHANCED AIR FLOW

(71) Applicant: BLACK & DECKER INC., New Britain, CT (US)

(72) Inventors: Colin M. Crosby, Baltimore, MD (US); Joseph P. Kelleher, Parkville, MD (US); Ryan F. Schroeder, Hampstead, MD (US); Joseph C. Baybrick, Parkville, MD (US); Richard Dizon, Towson, MD (US)

(73) Assignee: BLACK & DECKER INC., New Britain, CT (US)

( * ) Notice: Subject to any disclaimer, the term of this patent is extended or adjusted under 35 U.S.C. 154(b) by 170 days.

(21) Appl. No.: 18/341,639

(22) Filed: Jun. 26, 2023

(65) Prior Publication Data

US 2023/0421018 A1  Dec. 28, 2023

Related U.S. Application Data

(60) Provisional application No. 63/367,093, filed on Jun. 27, 2022.

(51) Int. Cl.
*H02K 5/20* (2006.01)
*B25F 5/00* (2006.01)
(Continued)

(52) U.S. Cl.
CPC ............ *H02K 5/207* (2021.01); *B25F 5/008* (2013.01); *H02K 5/15* (2013.01); *H02K 7/145* (2013.01); *H02K 9/06* (2013.01); *H02K 11/33* (2016.01); *H02K 2205/09* (2013.01); *H02K 2211/03* (2013.01)

(58) Field of Classification Search
CPC . H02K 9/02; H02K 9/19; H02K 9/227; B27B 9/00; B23Q 15/00; B23D 47/12; B23D 45/16; B23D 59/001; B24B 23/028; B25F 5/00
See application file for complete search history.

(56) References Cited

U.S. PATENT DOCUMENTS

2011/0001368 A1    1/2011  Lau
2014/0125159 A1    5/2014  Ito et al.
(Continued)

FOREIGN PATENT DOCUMENTS

EP    2711139 A2    3/2014
EP    2802063 A2    11/2014
(Continued)

OTHER PUBLICATIONS

Extended European Search Report, EP Application No. 23181733.9, Nov. 7, 2023, 8 pages, EPO.

*Primary Examiner* — Leda T Pham
(74) *Attorney, Agent, or Firm* — Scott B. Markow

(57) ABSTRACT

A power tool includes a housing extending generally along a tool axis with opposing lateral side surfaces separated by a first distance, a motor contained in the housing, and an end cap coupled to a rear end of the housing, the end cap having opposed lateral wings extending radially outward from the side surfaces by a second distance that is greater than the first distance. At least one air intake vent is disposed proximate at least one of the wings to allow intake of air ambient air to cool the motor.

19 Claims, 19 Drawing Sheets

(51) Int. Cl.
*H02K 5/15* (2006.01)
*H02K 7/14* (2006.01)
*H02K 9/06* (2006.01)
*H02K 11/33* (2016.01)

(56) References Cited

U.S. PATENT DOCUMENTS

2017/0361416 A1  12/2017  Lutz et al.
2020/0001447 A1*  1/2020  Yang ........................ H02K 9/02
2020/0276694 A1*  9/2020  Esenwein ............... B25F 5/008

FOREIGN PATENT DOCUMENTS

EP       3534504 A1   9/2019
JP      2010036260 A   2/2010

\* cited by examiner

POWER TOOL WITH ENHANCED AIR FLOW

RELATED APPLICATION

This application claims priority under 35 U.S.C. § 119(e) to U.S. Provisional Application No. 63/367,093, filed Jun. 27, 2022, titled "Power Tool with Enhanced Air Flow," which is hereby incorporated by reference.

TECHNICAL FIELD

This application relates to a power tool (e.g., a drill or impact driver) with enhanced air flow for cooling the motor, electronics, and/or transmission.

BACKGROUND

Many power tools, such as drills and impact drivers, include air intake vents on the rear or side faces of the motor housing for receiving air for cooling the motor, electronics, and/or transmission. Users will sometimes grip the power tool by the motor housing such that portions of their hand will cover the air intake vents, impeding air flow.

SUMMARY

In an aspect, a power tool includes a housing extending generally along a tool axis with opposing lateral side surfaces separated by a first distance, a motor contained in the housing, and an end cap coupled to a rear end of the housing, the end cap having opposed lateral wings extending radially outward from the side surfaces by a second distance that is greater than the first distance. At least one air intake vent is disposed proximate at least one of the wings to allow intake of air to cool the motor.

Implementations of this aspect may include one or more of the following features. The wing may prevent a user's hand from blocking the air vent when gripping the power tool on the side surfaces. The at least one air intake vent may include at least one air intake vent proximate each wing. The air intake vent may be formed by a gap between the wing of the end cap and the side surface of the housing. The air intake vent may be oriented generally orthogonal to the tool axis. The air intake vent may be oriented at an acute angle to the tool axis. The air intake vent may be oriented in a direction opposite the direction of airflow through the tool housing. The housing may include one or more air exhaust vents. The air intake vents may be disposed axially rearward of the motor and the exhaust vents may be disposed axially forward of the motor. The motor may include a fan for drawing air into the air intake vent and blowing air out of the exhaust vent.

In another aspect, a power tool includes a housing extending along a tool axis with opposing lateral side surfaces separated by a first distance; a motor contained in the housing and including a stator that is stationary relative to the housing, a rotor that rotates relative to the stator, a motor output shaft rotatably driven by the stator, and a fan coupled to the motor output shaft axially forward of the motor; and an end cap coupled to a rear end portion of the housing, the end cap having opposed lateral wings extending radially outward from the side surfaces by a second distance that is greater than the first distance. At least one first intake vent is disposed proximate at least one of the lateral wings and axially rearward of the motor, the air intake vents oriented transverse to the axis. An exhaust vent is defined in the housing axially forward of the motor and proximate the fan. Upon actuation of the motor, air flows into the housing through the at least one first intake vent along a first path, over or through the motor, and out of the exhaust vents. The wings are configured to inhibit blockage of the first intake vents.

Implementations of this aspect may include one or more of the following features. A wing may prevent a user's hand from blocking the air vent when gripping the power tool on the side surfaces. The at least one first air intake vent may include at least one first air intake vent proximate each of the wings. The at least one first air intake vent may be defined by a gap between the wing of the end cap and the side surface of the housing. The first air intake vent may be oriented transverse to the tool axis. The first air intake vent may be oriented orthogonal to the tool axis. The first air intake vent may be oriented at an acute angle to the tool axis in a direction opposite the direction of airflow through the tool housing. A handle with a first end portion may be coupled to the housing and a second end portion may be disposed away from the housing, the second end portion including at least one second intake vent. A control board may be disposed in the handle, where upon actuation of the motor, air flows along a second path over the control board and then mixes with the air from the at least one first intake vent to flow over or through the motor to the at least one exhaust vent. A trigger switch may be coupled to the handle proximate the first end portion with a space defined between the trigger and the handle to form a third intake, where upon actuation of the motor, air flows along a third path over the switch and then mixes with the air from the at least one first air intake vent to flow over or through the motor to the at least one exhaust vent. At least one fourth intake vent may be defined in a rear of the end cap, where upon actuation of the motor, air flows along a fourth path over the control board and then mixes with the air from the at least one first intake vent to flow over or through the motor to the at least one exhaust vent. In an implementation, 50% to 75% of air that enters the housing may flow through the at least one first intake vent and the at least one fourth air vent to cool the motor and 15% to 25% of air that enters the housing may flow through the at least one second intake vent to cool the control board.

In another aspect, a power tool includes a housing extending along a tool axis with opposing lateral side surfaces; an end cap coupled to a rear end portion of the housing; a motor contained in the housing and including a stator that is stationary relative to the housing, a rotor that rotates relative to the stator, a motor output shaft rotatably driven by the stator, and a fan coupled to the motor output shaft axially forward of the motor; a handle having a first end coupled to and extending transverse to the housing to a second end portion; and a control board disposed in the handle. At least one first intake vent is disposed axially rearward of the motor and between the end cap and the housing. At least one second intake vent is disposed proximate the second end portion of the handle. An exhaust vent is defined in the housing axially forward of the motor and proximate the fan. Upon actuation of the motor, air flows into the housing through the at least one first intake vent along a first path, over or through the motor, and to the at least one exhaust vent, and air flows into the housing through the at least one second intake vent along a second path over the control board and then mixes with the air from the at least one first intake vent to flow over or through the motor to the at least one exhaust vent.

Implementations of this aspect may include one or more of the following features. A trigger switch may be coupled to the handle proximate the first end portion with a space defined between the trigger and the handle to form a third intake, where upon actuation of the motor, air flows along a third path over the switch and then mixes with the air from the at least one first air intake vent to flow over or through the motor to the at least one exhaust vent. At least one fourth intake vent may be defined in a rear of the end cap, where upon actuation of the motor, air flows along a fourth path over the control board and then mixes with the air from the at least one first intake vent to flow over or through the motor to the at least one exhaust vent. In an implementation, 50% to 75% of air that enters the housing flows through the at least one first intake vent and the at least one fourth air vent to cool the motor and 15% to 25% of air that enters the housing flows through the at least one second intake vent to cool the control board. The end cap may have opposed lateral wings extending radially outward from the side surfaces by a second distance that is greater than a first distance between the side surfaces. The lateral wings may be configured to redirect airflow from a direction transverse to the axis to a direction along the axis.

In another aspect, a power tool includes a housing extending along a tool axis with opposing lateral side surfaces; an end cap coupled to a rear end portion of the housing; a motor contained in the housing and including a stator that is stationary relative to the housing, a rotor that rotates relative to the stator, a motor output shaft rotatably driven by the stator, and a fan coupled to the motor output shaft axially forward of the motor; a handle having a first end coupled to and extending transverse to the housing to a second end portion; and a control board disposed in the handle. At least one first intake vent is disposed axially rearward of the motor proximate the end cap. At least one second intake vent is disposed proximate the second end portion of the handle. An exhaust vent is defined in the housing axially forward of the motor and proximate the fan. Upon actuation of the motor, approximately 50% to 75% of air that enters the housing flows into the housing through the at least one first intake vent along a first path, over or through the motor, and to the at least one exhaust vent, and approximately 15% to 25% of air that enters the housing flows into the housing through the at least one second intake vent along a second path over the control board and then mixes with the air from the at least one first intake vent to flow over or through the motor to the at least one exhaust vent.

Advantages may include one or more of the following. The wings on end cap may help prevent blockage of air intake vents during use of the power tool. The arrangement of the air intakes and exhaust vents with the fan disposed in front of the motor may facilitate improved cooling of the motor, which tends to grow hotter than the control board, and improved mixing of air that is used to cool the control board and the motor. The arrangement of air intakes and the exhaust vents may also help direct air to cool the motor, the control board, and the electronics in an efficient manner that may correspond to the amount of heat generated by each component. These and other advantages and features will be apparent from the description, the drawings, and the claims.

DETAILED DESCRIPTION

Figure 1:
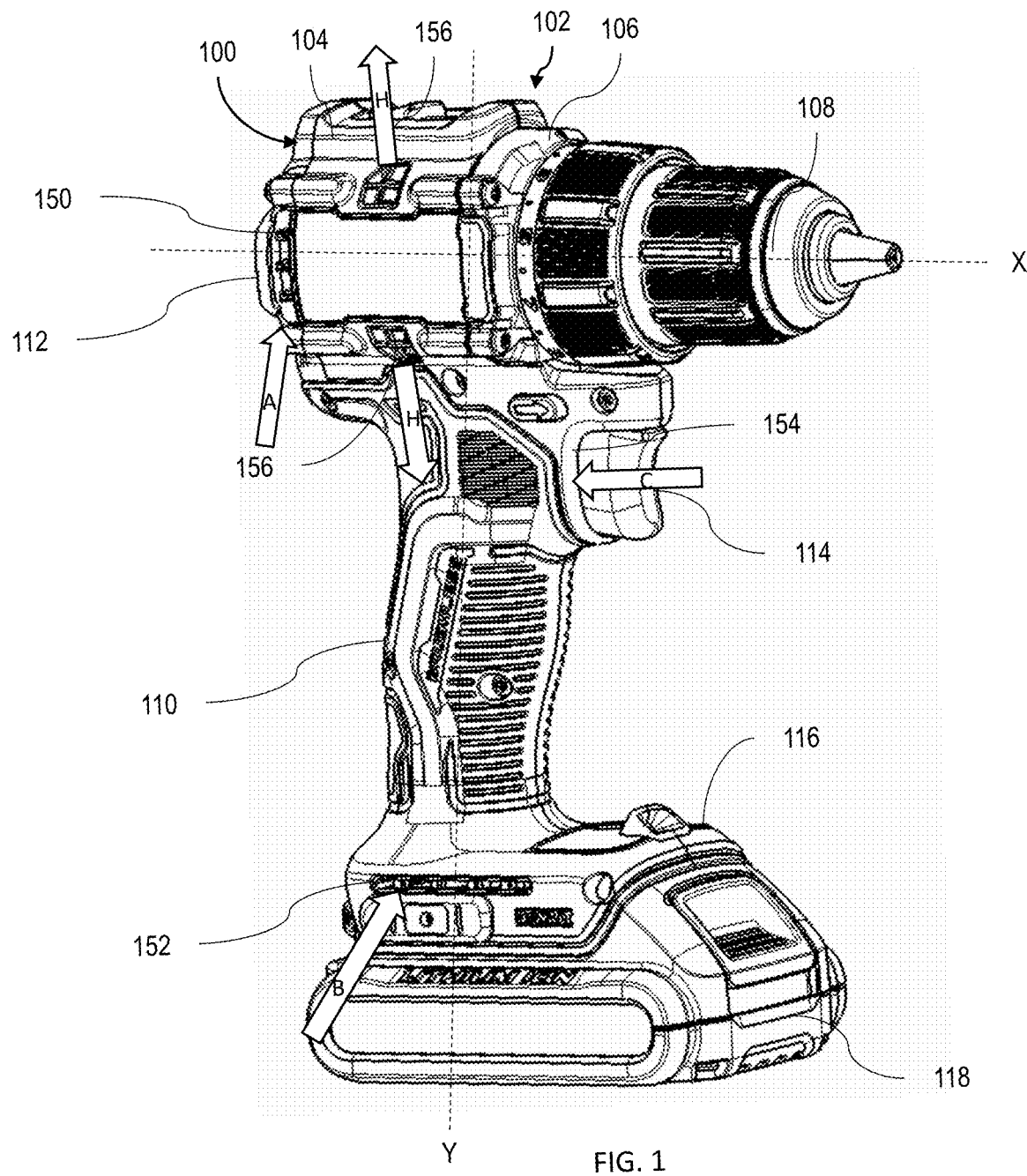
FIG. 1 is a perspective view of an exemplary embodiment of a power tool.
Figure 2:
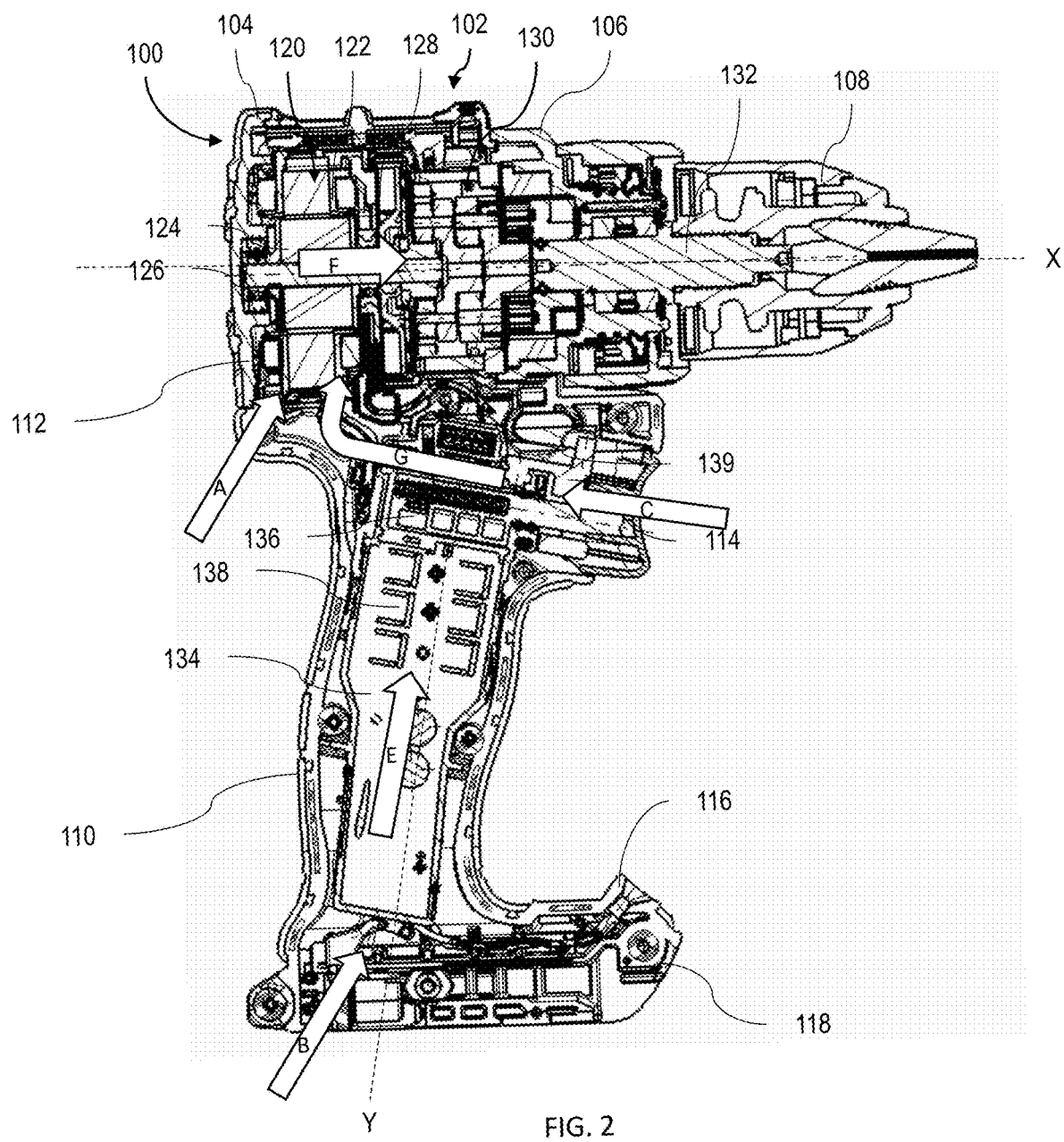
FIG. 2 is a side cross-sectional view of the power tool of FIG. 1.
Figure 3:
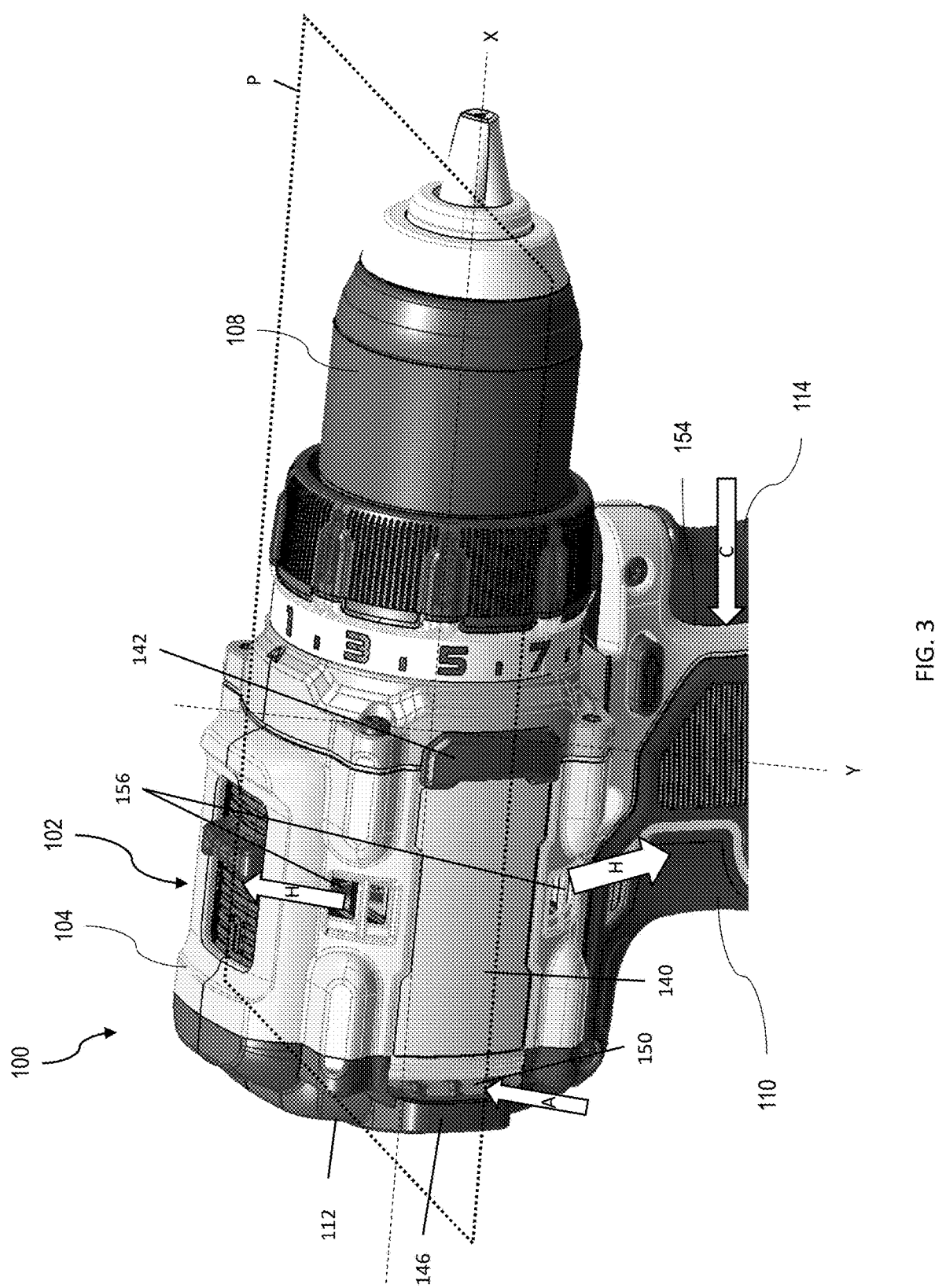
FIG. 3 is a close-up side perspective view of a portion of the power tool of FIG. 1.
Figure 4:
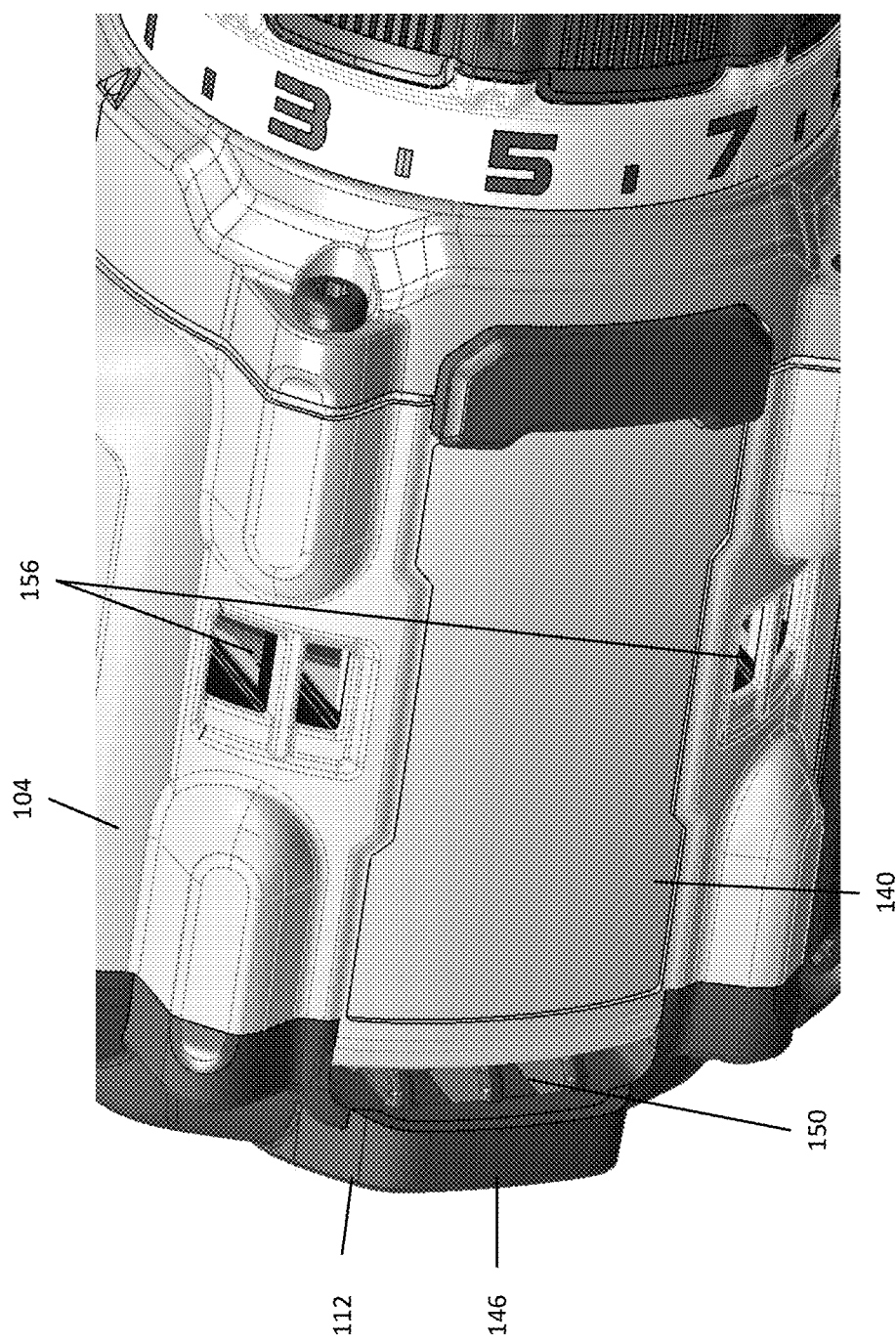
FIG. 4 is a close-up side perspective view of a portion of the power tool of FIG. 1.
Figure 5:
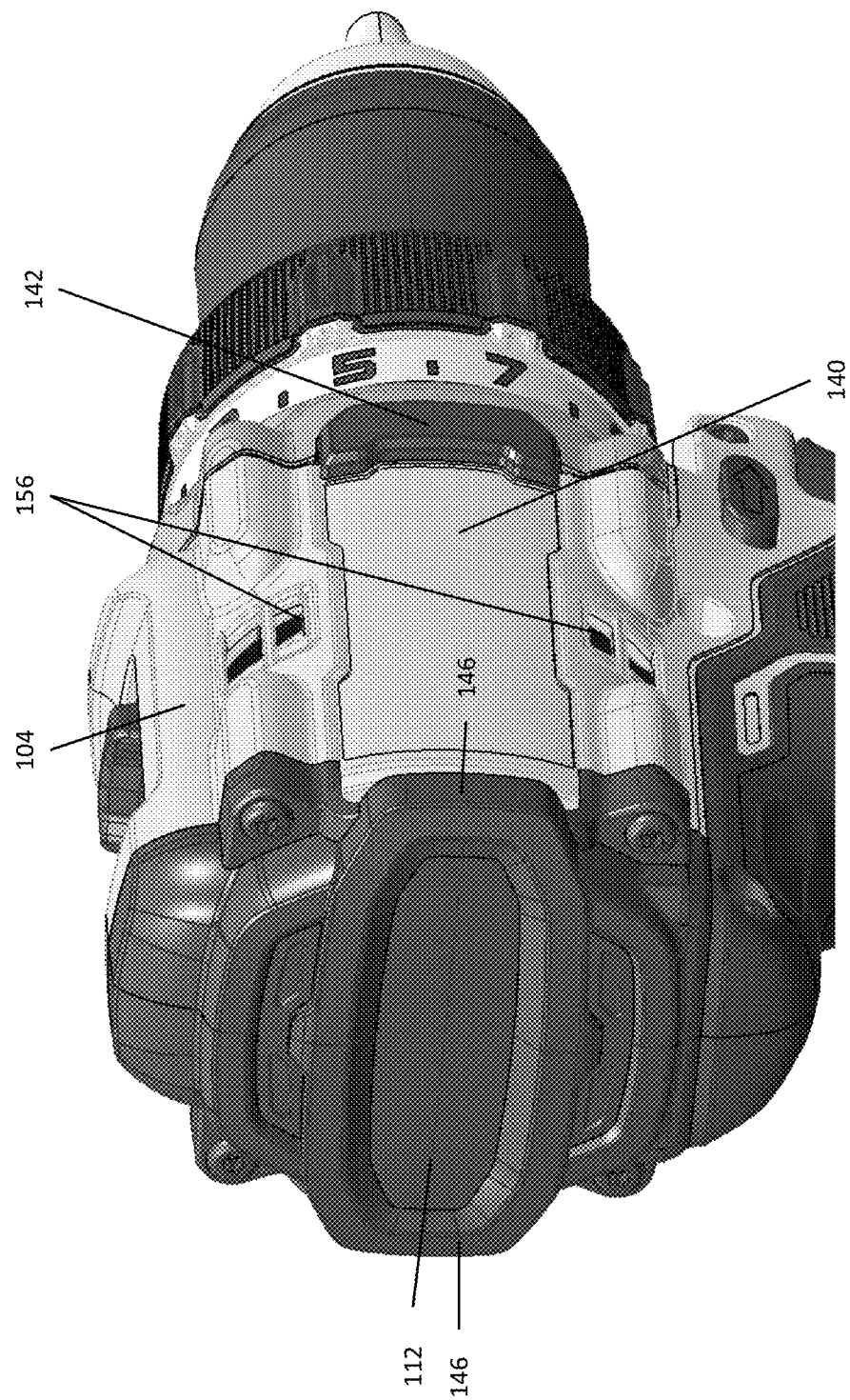
FIG. 5 is a close-up rear perspective view of a portion of the power tool of FIG. 1.
Figure 6:
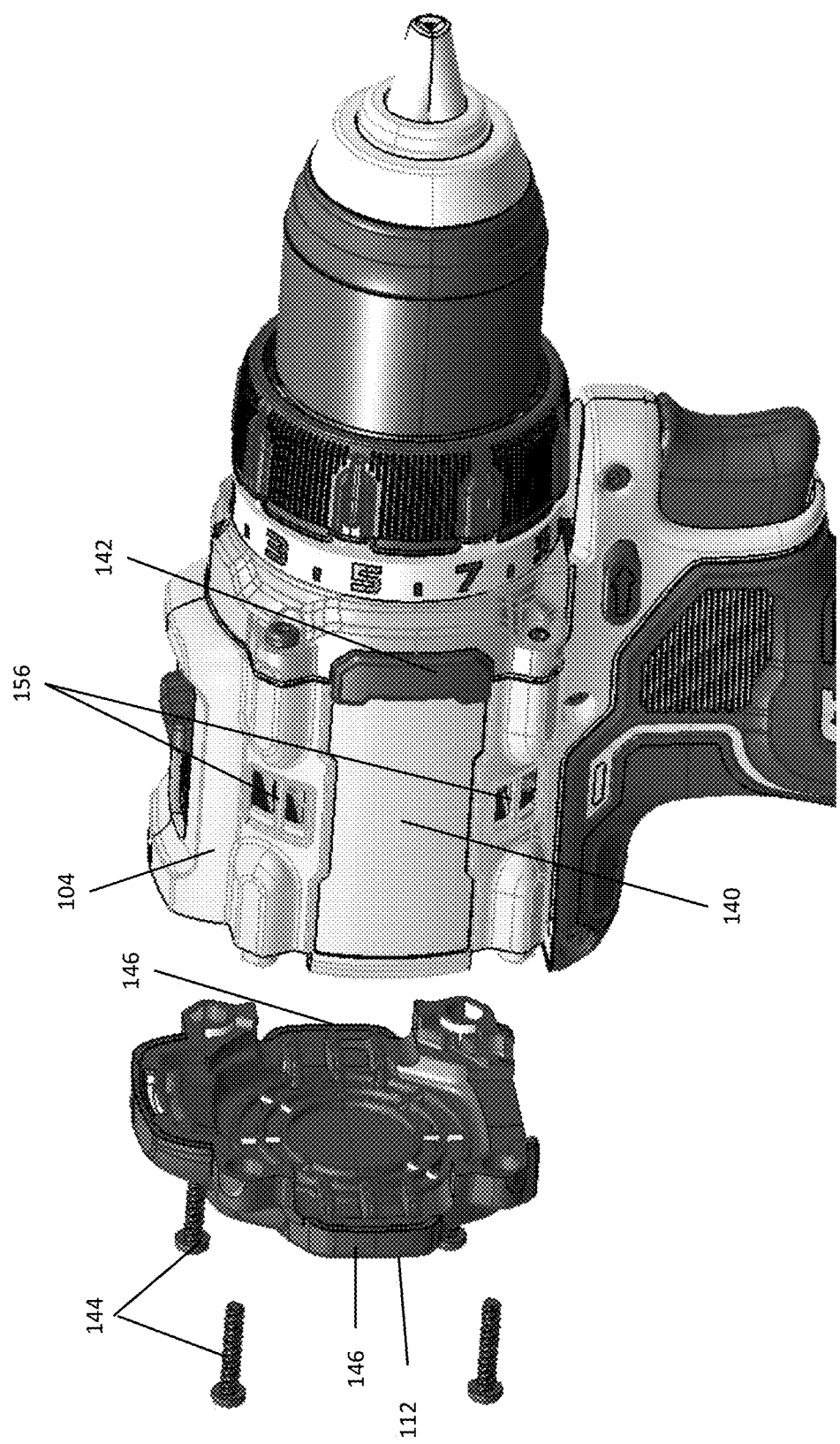
FIG. 6 is a close-up side exploded view of a portion of the power tool of FIG. 1.
Figure 7:
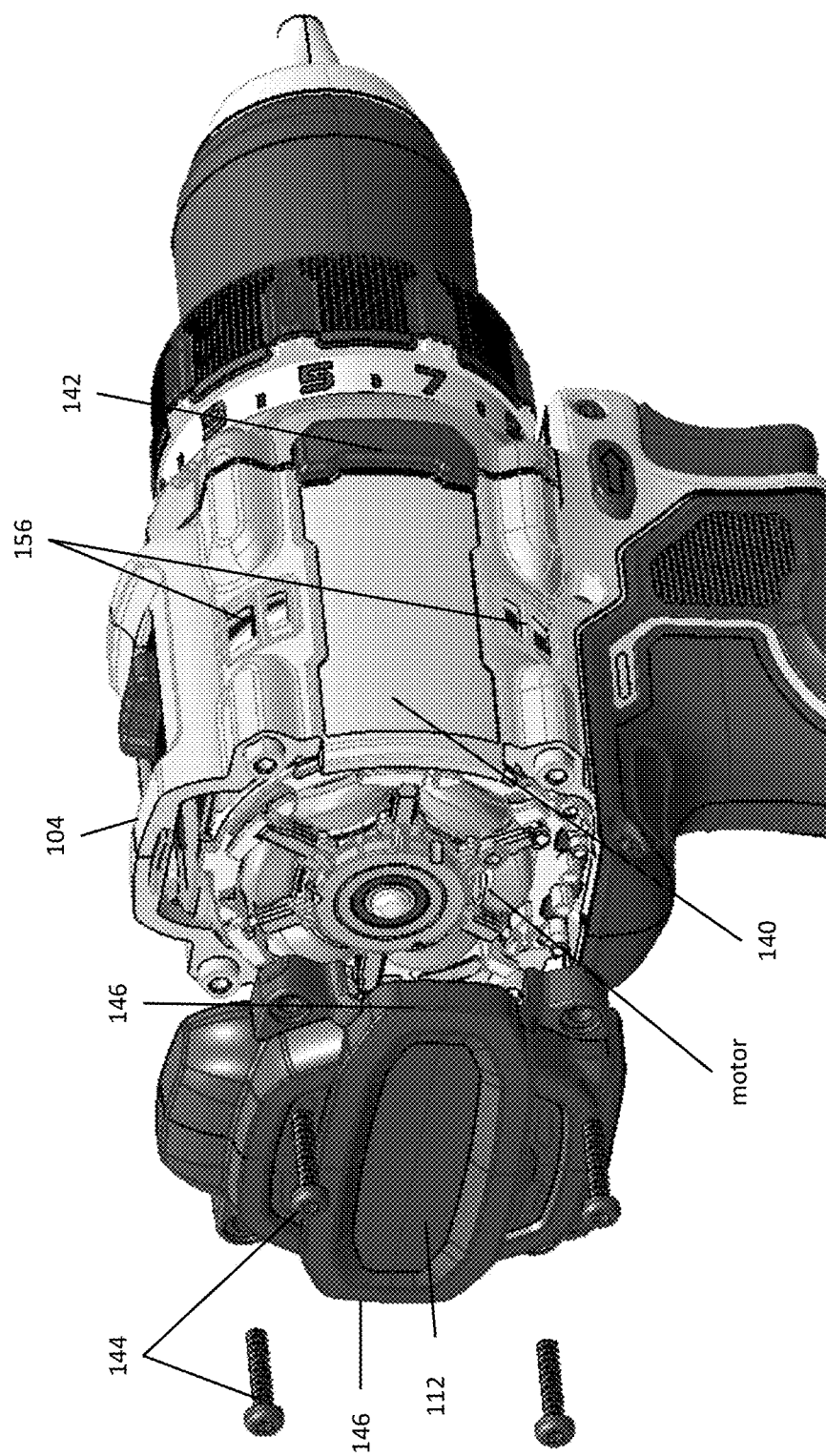
FIG. 7 is a close-up rear exploded view of a portion of the power tool of FIG. 1.

Referring to FIGS. 1-6, in an exemplary embodiment, a power tool 100 (e.g., a drill, an impact driver, or a screwdriver) includes a housing 102 including a motor housing portion 104 and a transmission housing portion 106 extending along a tool axis X, an end cap 112 coupled to a rear end of the motor housing portion 106, a tool holder 108 (such as a chuck or a quick release tool holder) extending axially forward of the housing 102, and a handle 110 coupled to the housing 102 and extending downward and transverse to the housing 102 along a handle axis Y. The handle axis Y may be at a right angle or an obtuse angle (e.g., approximately 100° to 115° relative to the tool axis X. Coupled to a top of the handle 110 adjacent the housing 102 is a trigger switch 114 for actuating the power tool. Coupled to a bottom of the handle 110 away from the housing 102 is a battery receptacle 116 configured to receive a removable and rechargeable battery pack 118 for providing power to the power tool 100. In other implementations, the power tool may be powered by alternative power sources such as an AC power cord, compressed air, or a combustion engine.

Disposed inside the motor housing portion 104 is a motor 120 (e.g., an electric motor such as a brushless DC motor). The motor 120 includes a stator 122 that is stationary relative to the housing 102 and a rotor 124 that rotates relative to the housing 102 and that drives a motor output shaft 126. Coupled to the front of the rotor 124 is a fan 128 for cooling the motor as described in greater detail below. The output shaft of the motor drives a transmission 130 (e.g., a planetary transmission) that is disposed in the transmission housing portion 106 axially forward of the fan 128. The transmission 130 rotationally drives an output spindle 132, which in turn rotationally drives the tool holder 108. Disposed in the handle is a control board 134 that carries electronic components, such as a controller 136 (e.g., a microcontroller), a plurality of electronic switching elements 138 (e.g., FETs), and an electronic switch 139 coupled to the trigger, which control operation of the motor 120 in response to actuation of the trigger switch 114.

The housing 102 includes opposed lateral side surfaces 140 separated by a first distance D1. The housing also optionally includes lateral bumpers 142 that extend radially outward from the lateral side surfaces 140. The bumpers 142 help protect the housing 102 and its internal components if the tool is dropped. The rear portion of the motor housing portion 104 is closed by the end cap 112, which may be coupled to the motor housing portion 104 by a plurality of fasteners 144 (e.g., screws or bolts). The end cap 112 includes a pair of lateral wings 146 aligned with the side surfaces and that extend radially outward by a second distance D2 that is greater than the first distance D1.

The power tool 100 includes a set of first air intake vents 150 at the rear end of the side surfaces 140 and a set of second air intake vents 152 disposed in the battery receptacle 116 or at the bottom of the handle 110. The first air intake vents 150 are formed in gaps between the wings 146 of the end cap 112 and the rear end of the side surfaces 140. However, the first air intake vents could be formed in the end cap adjacent the housing or in the side surfaces of the housing adjacent the end cap. The first intake air vents 150 are oriented transverse (e.g., orthogonally) to the tool axis and are located rearward of the motor 120. Air is also able to enter the power tool 100 via a third air intake defined as a space 154 between the trigger 114 and the handle 110. A set of exhaust vents 156 are disposed in the side surfaces 140 of the housing 102 forward of the motor 120 and adjacent or in line with the fan 128.

When the fan 128 rotates during motor operation, air enters the housing through the first air intake vents 150 along arrows A, through the battery receptacle 116 through the second air intake vents 152 along arrow B, and through the space 154 in the trigger 114 along arrow C. The air from the first air intake vents 150 flows over and/or through the motor 120 along arrows F. The air from the second air intake vents 152 flows over the control board 134 along arrow E and then mixes with the air from first air intake vents 150 to flow over and/or through the motor 120 along arrows F. The air from the third air intake space 154 flows over the trigger and then mixes with the air from first air intake vents 150 to flow over and/or through the motor along arrows G and F. All or most of the air that flows over and/or through the motor exits the housing 102 through the exhaust vents 156 along arrows H.

Figure 8:
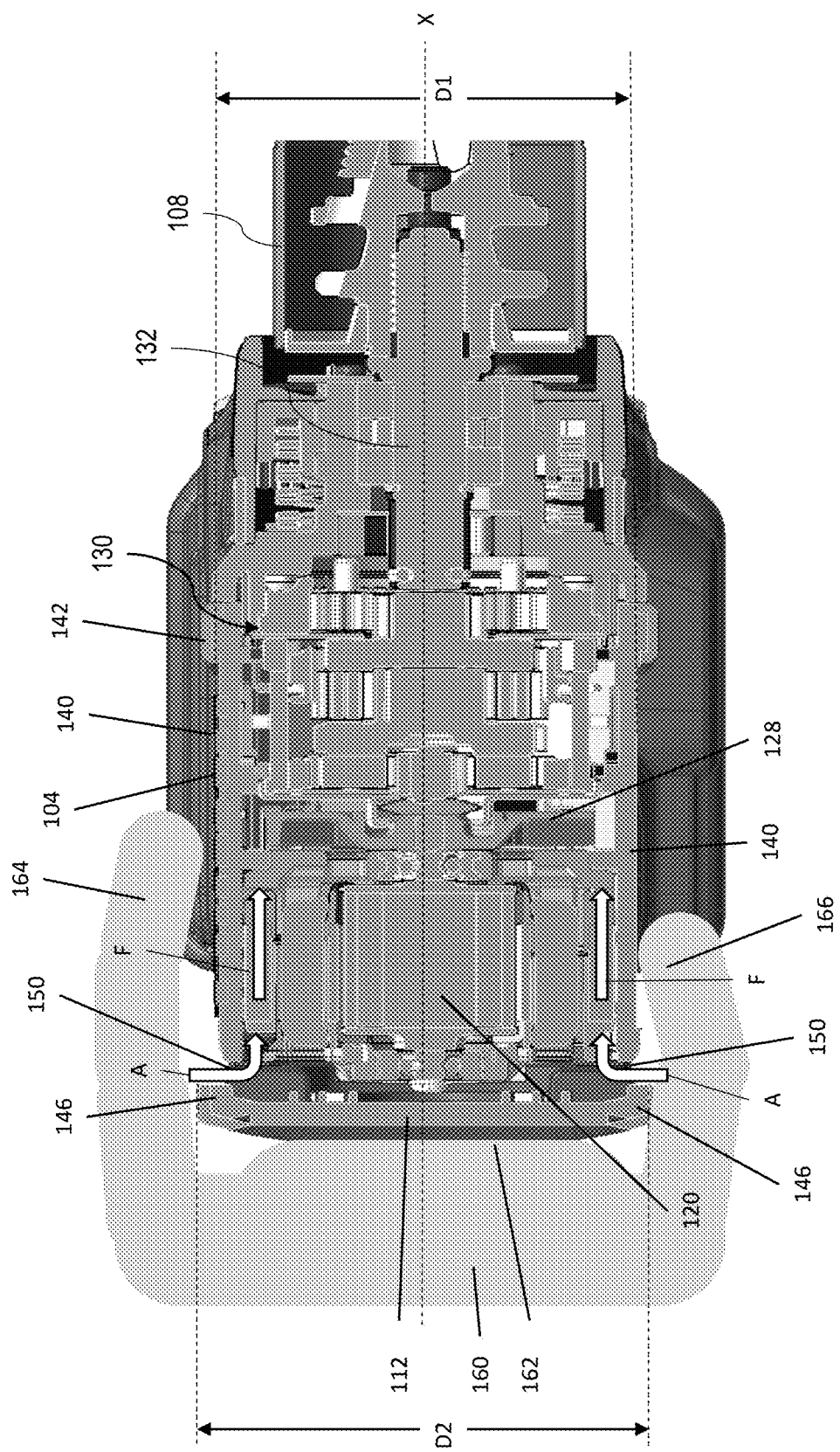
FIG. 8 is a cross-sectional view of the power tool of FIG. 1 taken along plane P in FIG. 4.
Figure 9:
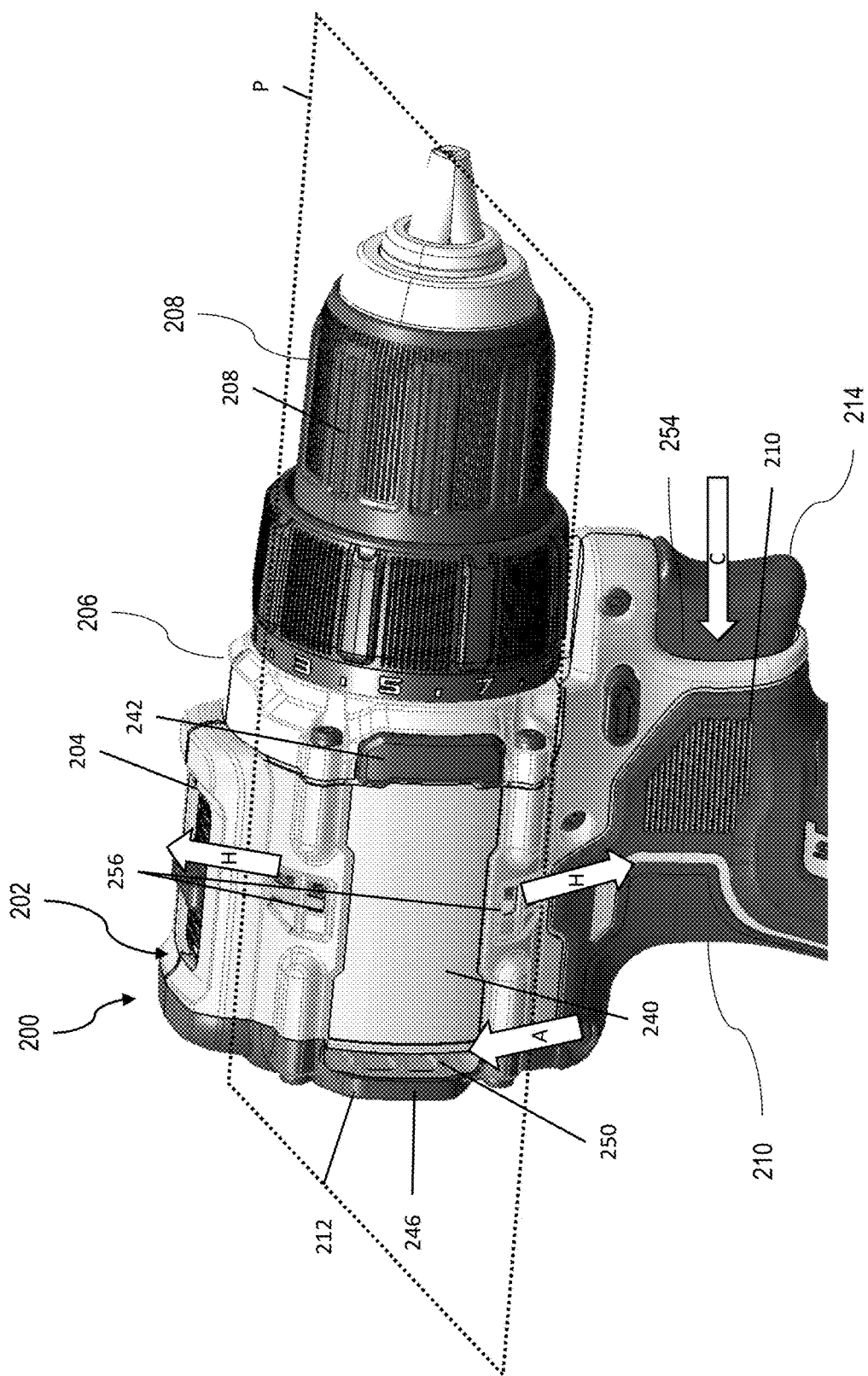
FIG. 9 is a perspective view of an exemplary embodiment of a power tool.
Figure 10:
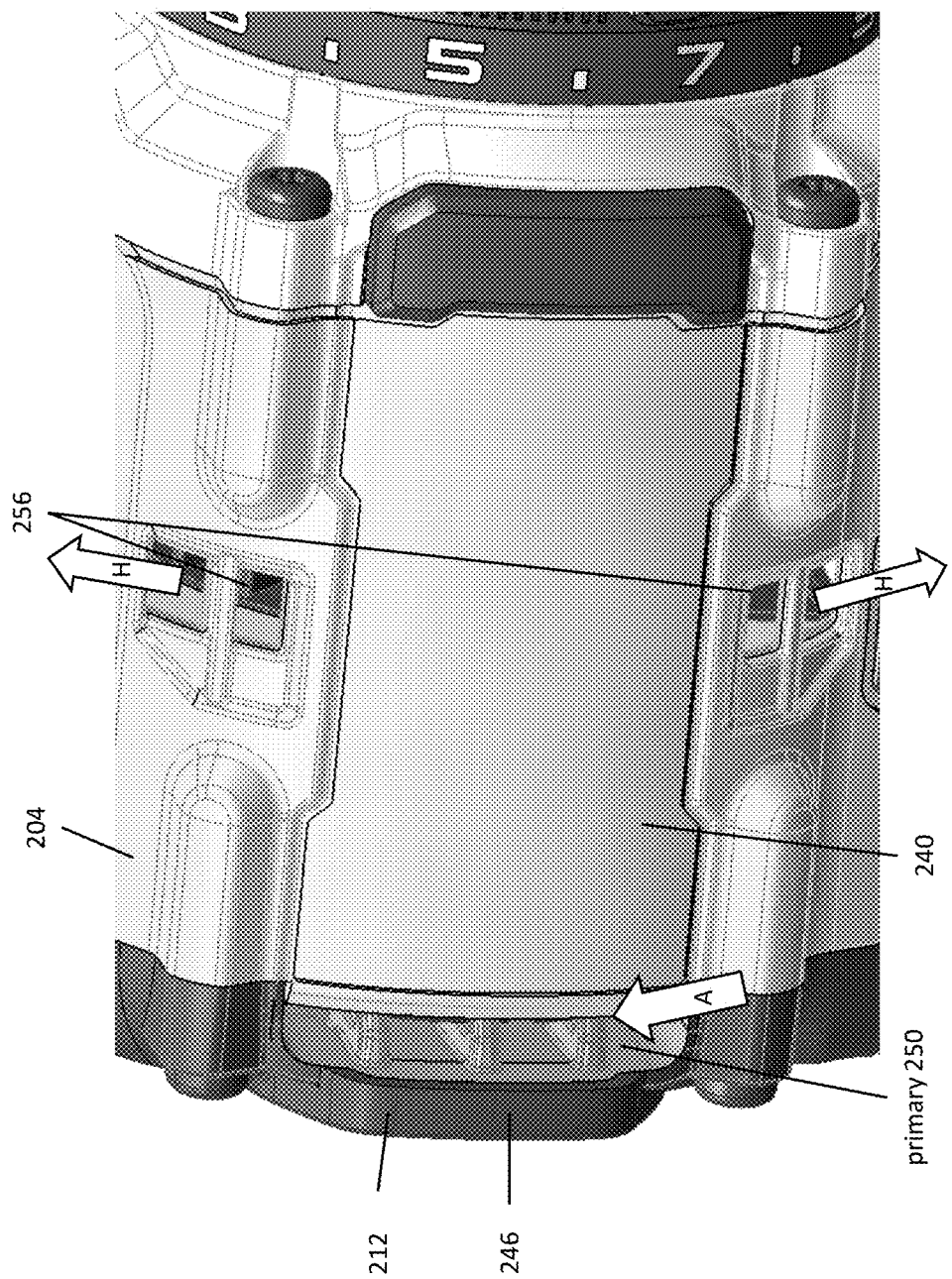
FIG. 10 is a close-up side perspective view of a portion of the power tool of FIG. 9.
Figure 11:
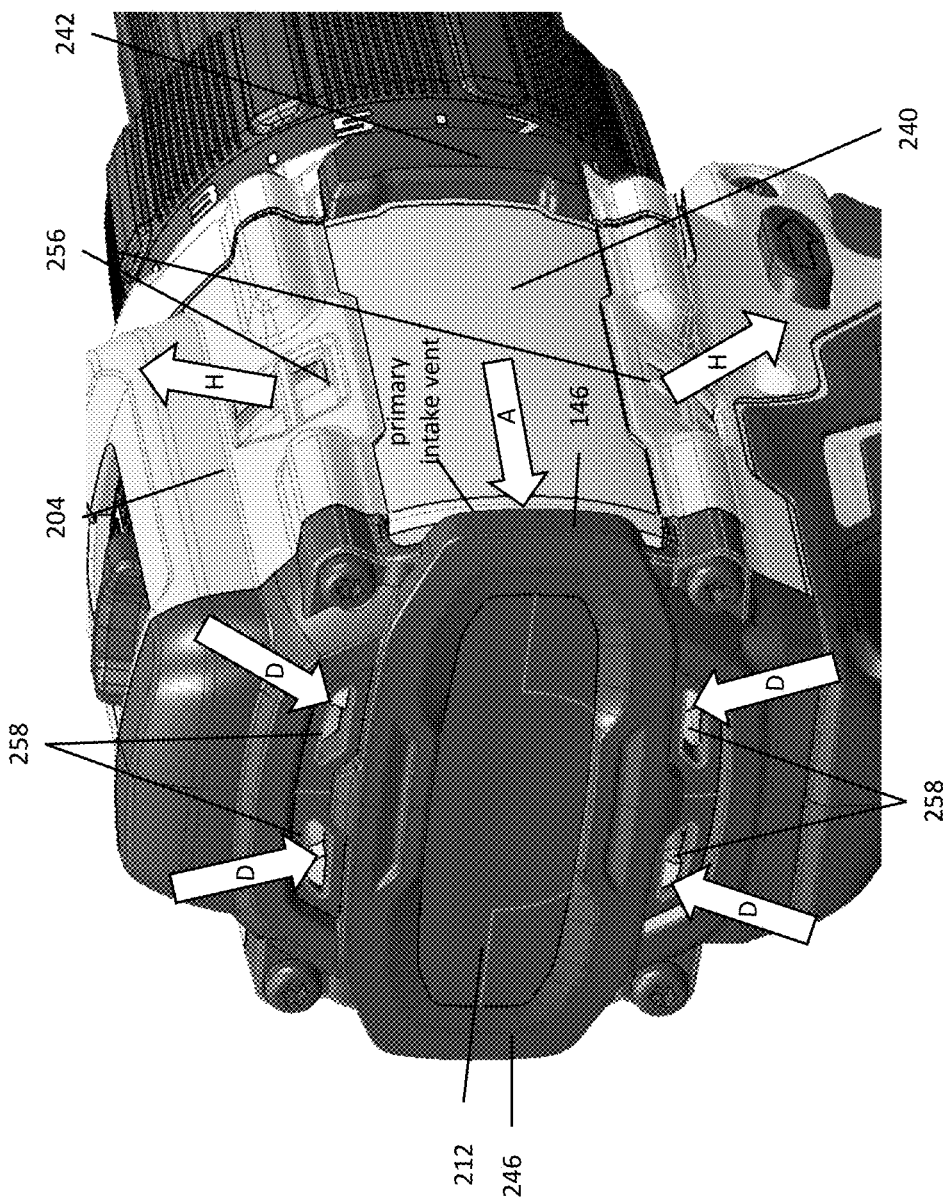
FIG. 11 is a close-up rear perspective view of a portion of the power tool of FIG. 9.
Figure 12:
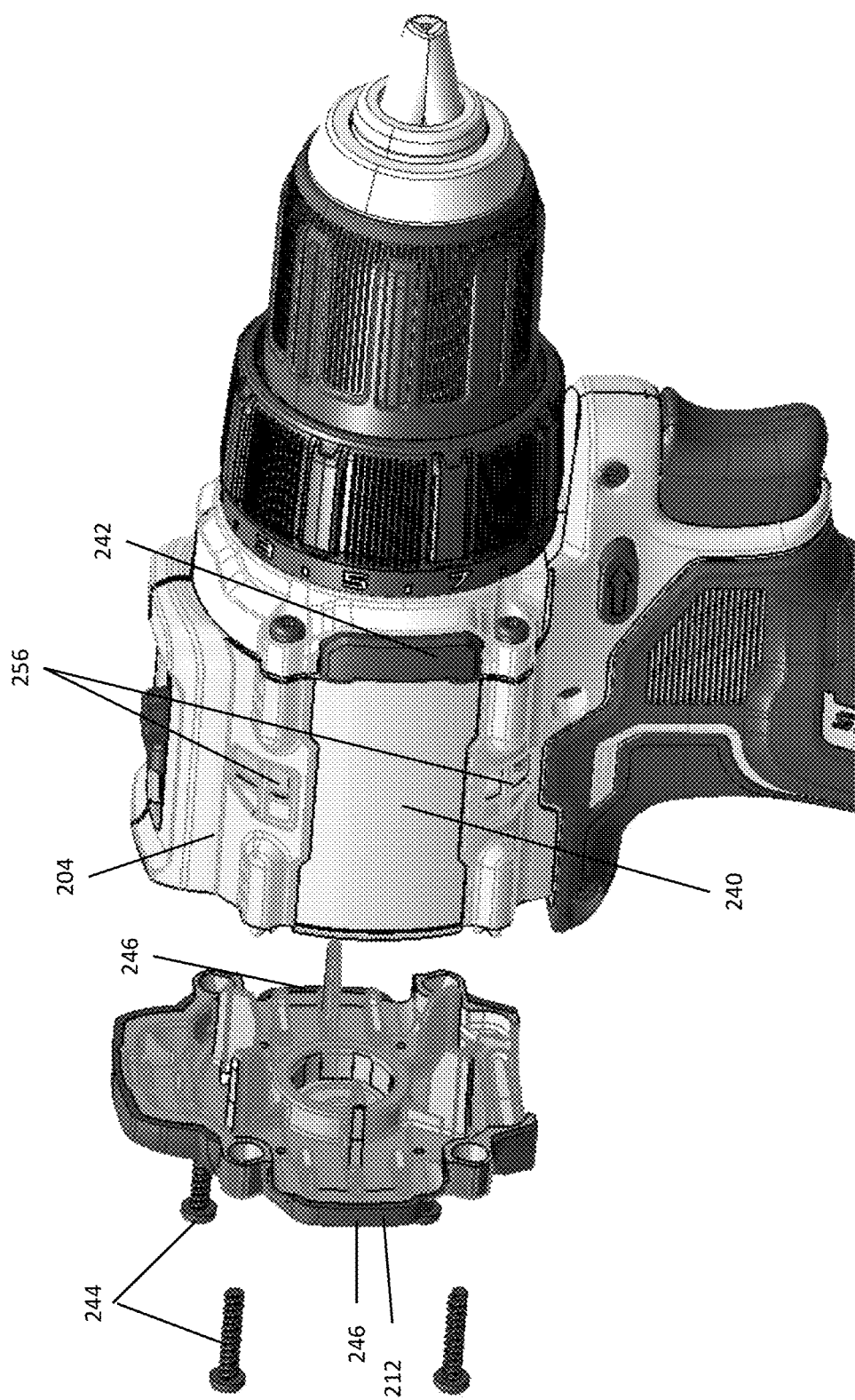
FIG. 12 is a close-up side exploded view of a portion of the power tool of FIG. 9.
Figure 13:
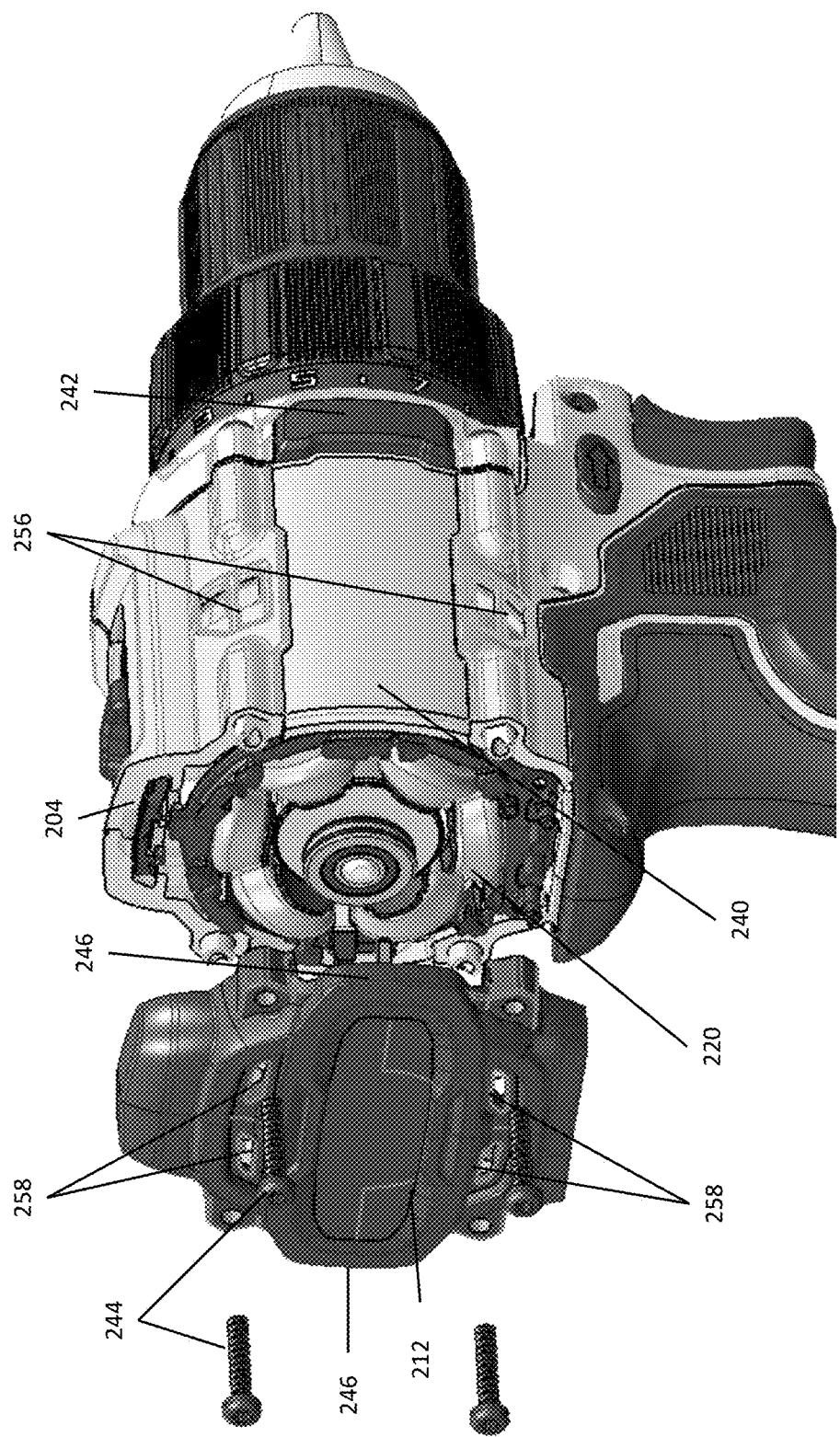
FIG. 13 is a close-up rear exploded view of a portion of the power tool of FIG. 9.

As shown in FIG. 8, the wings 146 extend radially outward a second distance D2 from the axis X that is greater than the first distance D1 that the side surfaces 140 extend outward from the axis X. This inhibits a user's hand 160 from completely covering the first air intake vents 150 when the tool is being gripped with the palm 162 of the hand 160 on the end cap 112 and the thumb 166 and fingers 164 on the side surfaces 140. The wings 146 also redirect air entering transverse to the axis to be parallel to the axis to flow over and/or through the motor. In addition, the outward projection of the wings 146 together with the bumpers 142 help to prevent direct impact onto the side surfaces 140 of the motor housing in the event the tool is dropped. This helps prevent damage to the housing and its internal components, including the motor.

Referring to FIGS. 10-14, in another embodiment, a power tool 200 (e.g., a drill, an impact driver, or a screwdriver) is similar to power tool 100 described above with the following differences, where like components have the same reference number starting with "2" instead of "1". The power tool 200 includes a housing 202 including motor housing portion 204 and a transmission housing portion 206 extending along a tool axis X, an end cap 212 coupled to a rear end of the motor housing portion 206, a tool holder 208 (such as a chuck or a quick release tool holder) extending axially forward of the housing 202, and a handle 210 coupled to the housing 202 and extending downward and transverse to the housing 202 along a handle axis Y.

Disposed inside the motor housing portion 204 is a motor 220 (e.g., an electric motor such as a brushless DC motor). The motor 220 includes a stator 222 that is stationary relative to the housing 202 and a rotor 224 that rotates relative to the housing 202 and that drives a motor output shaft 226. Coupled to the front of the rotor 224 is a fan 228 for cooling the motor, as described in greater detail below. The output shaft of the motor drives a transmission 230 (e.g., a planetary transmission) that is disposed in the transmission housing portion 206 axially forward of the fan 228. The transmission 230 rotationally drives an output spindle 232, which in turn rotationally drives the tool holder 208. Disposed in the handle is a control board (not shown) similar to control board 134 of the power tool 100.

The housing 202 includes opposed lateral side surfaces 240 separated by a first distance D1. The housing also optionally includes lateral bumpers 242 that extend radially outward from the lateral side surfaces 240. The bumpers 242 help protect the housing 202 and its internal components if the tool is dropped. The rear portion of the motor housing portion 204 is closed by the end cap 212, which may be coupled to the motor housing portion 204 by a plurality of fasteners 244 (e.g., screws or bolts). The end cap 212 includes a pair of lateral wings 246 aligned with the side surfaces and that extend radially outward by a second distance D2 that is greater than the first distance D1.

The power tool 200 includes a set of first air intake vents 250 at the rear end of the side surfaces 240. The power tool 200 also includes a set of second air intake vents disposed in the battery receptacle or at the bottom of the handle (not shown but similar to the power tool 100). The first air intake vents 250 are formed in gaps between the wings 246 of the end cap 212 and the rear end of the side surfaces 240. However, the first air intake vents could be formed in the end cap adjacent the housing or in the side surfaces of the housing adjacent the end cap. The first intake air vents 250 are oriented transverse (e.g., orthogonally) to the tool axis and are located rearward of the motor 220. Air is also able to end the power tool 200 via a third air intake defined as a space 254 between the trigger 214 and the handle 210. The end cap 212 also includes a set of fourth air intake vents 258 that extend through the end cap 212 to allow air to enter the housing in a direction generally parallel to the axis X. A set of exhaust vents 256 are disposed in the side surfaces 240 of the housing 202 forward of the motor 220 and adjacent or in line with the fan 228.

When the fan 228 rotates during motor operation, air enters the housing through the first air intake vents 250 along arrow A. Air also enters the handle through the battery receptacle through the second air intake vents (similar to arrow B shown in FIG. 1). Air also enters the housing through the space 254 in the trigger 214 along arrow C. Finally, air enters the housing 202 axially through the fourth air intake vents 258 along arrow D. The air from the first air intake vents 250 and the fourth air intake vents 258 flows over and/or through the motor 220 along arrow F. The air from the second air intake vents flows over the control board and then mixes with the air from first air intake vents 150 to flow over and/or through the motor 202 (similar to airflows E and F shown in FIG. 1). The air from the third air intake space 254 flows over the trigger switch and then mixes with the air from first air intake vents 150 to flow over and/or through the motor (similar to airflows G and F shown in FIG. 1). All or most of the air that flows over and/or through the motor exits the housing 202 through the exhaust vents 156 along arrows H.

Figure 14:
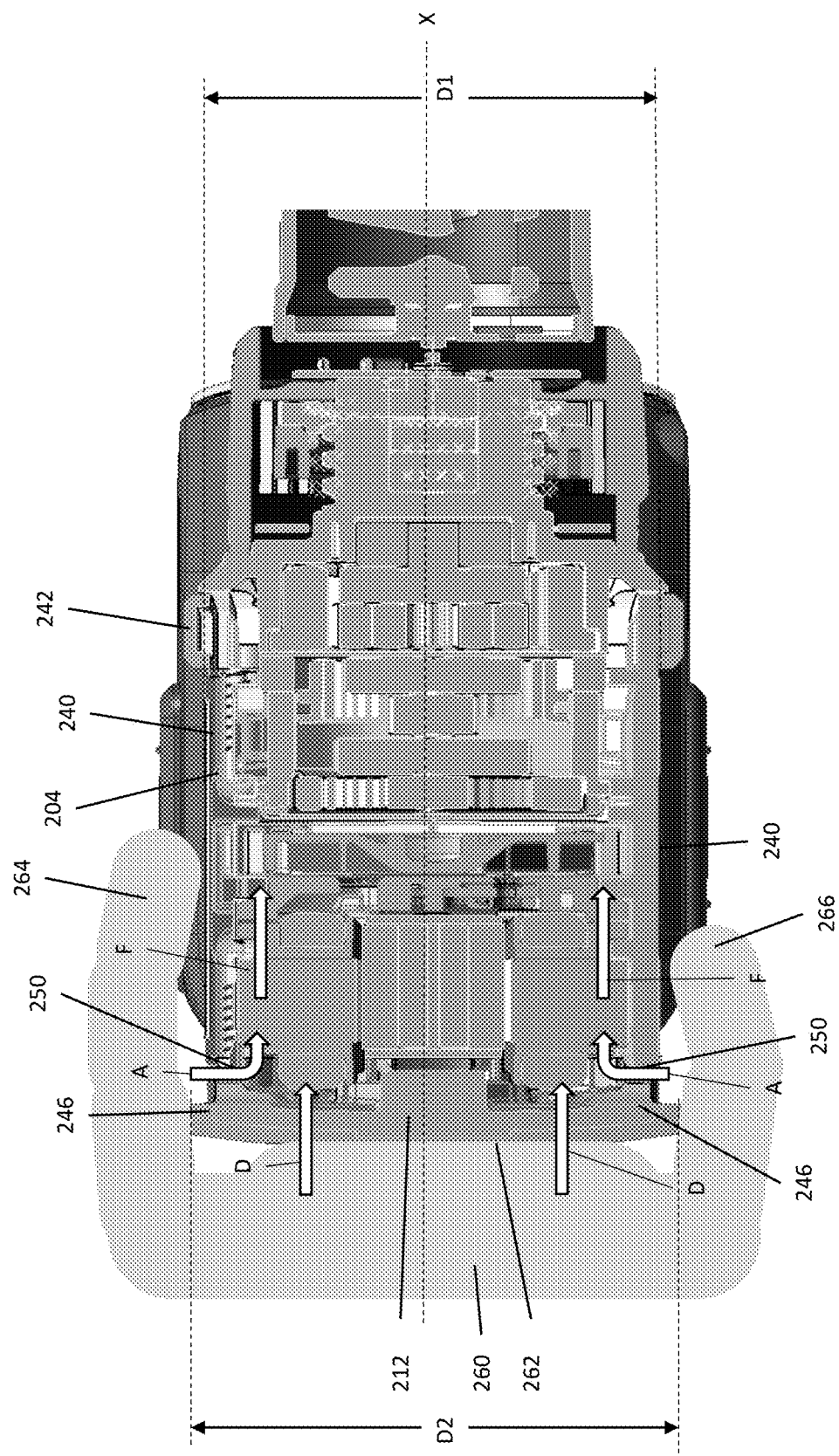
FIG. 14 is a cross-sectional view of the power tool of FIG. 9 taken along plane P.
Figure 15:
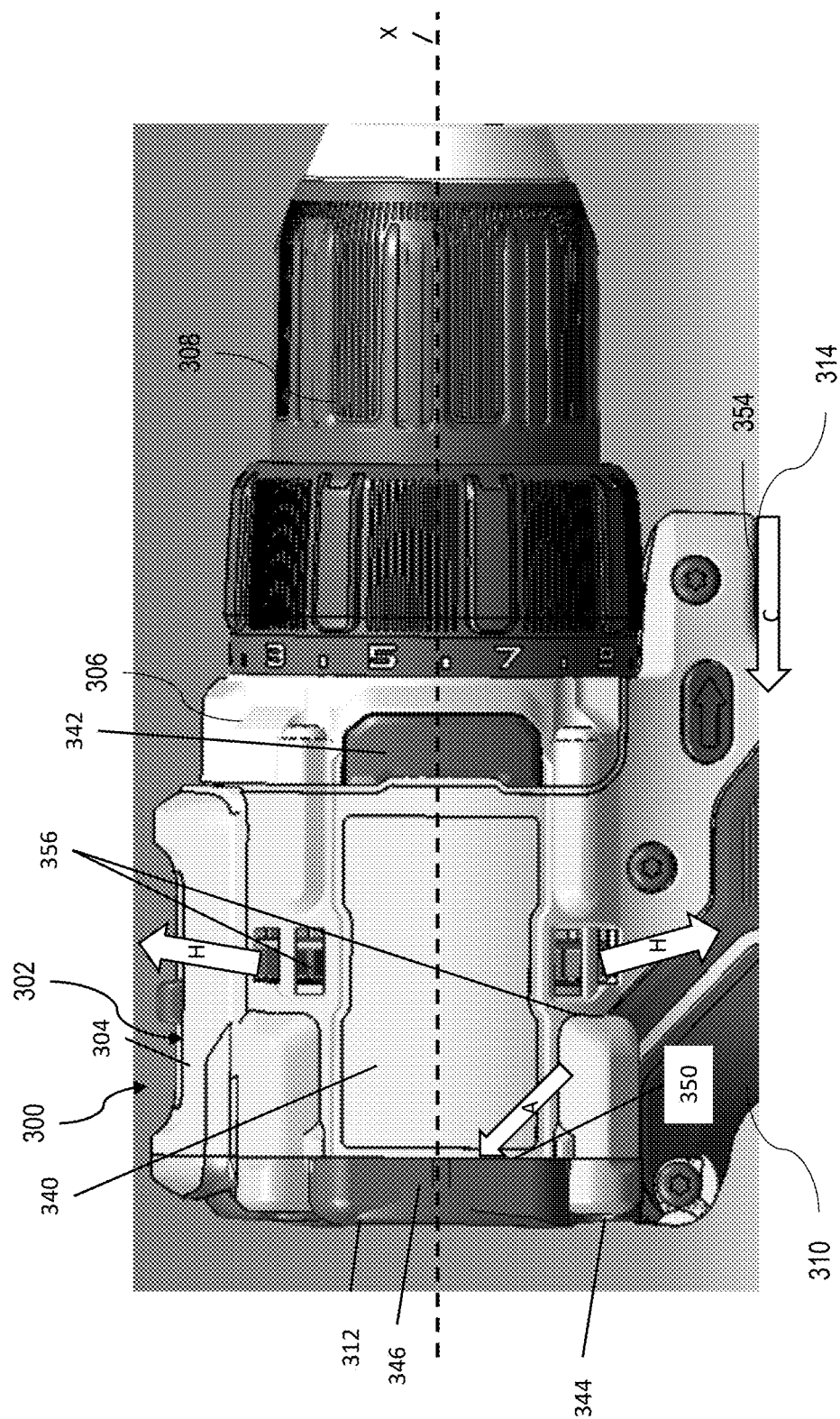
FIG. 15 is a side view of an exemplary embodiment of a power tool.
Figure 16:
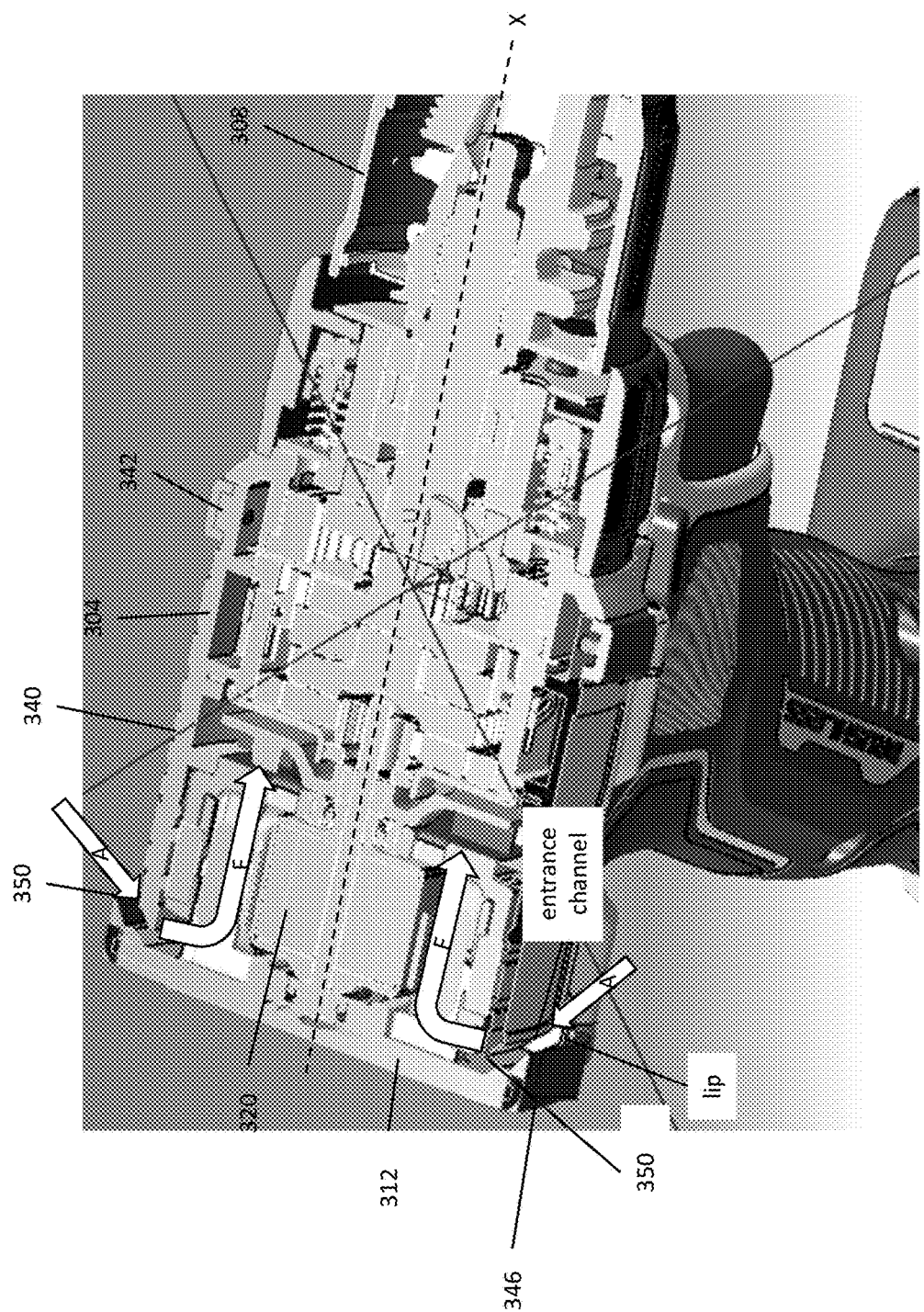
FIG. 16 is a perspective view partially in cross section of a portion of the power tool of FIG. 15.
Figure 17:
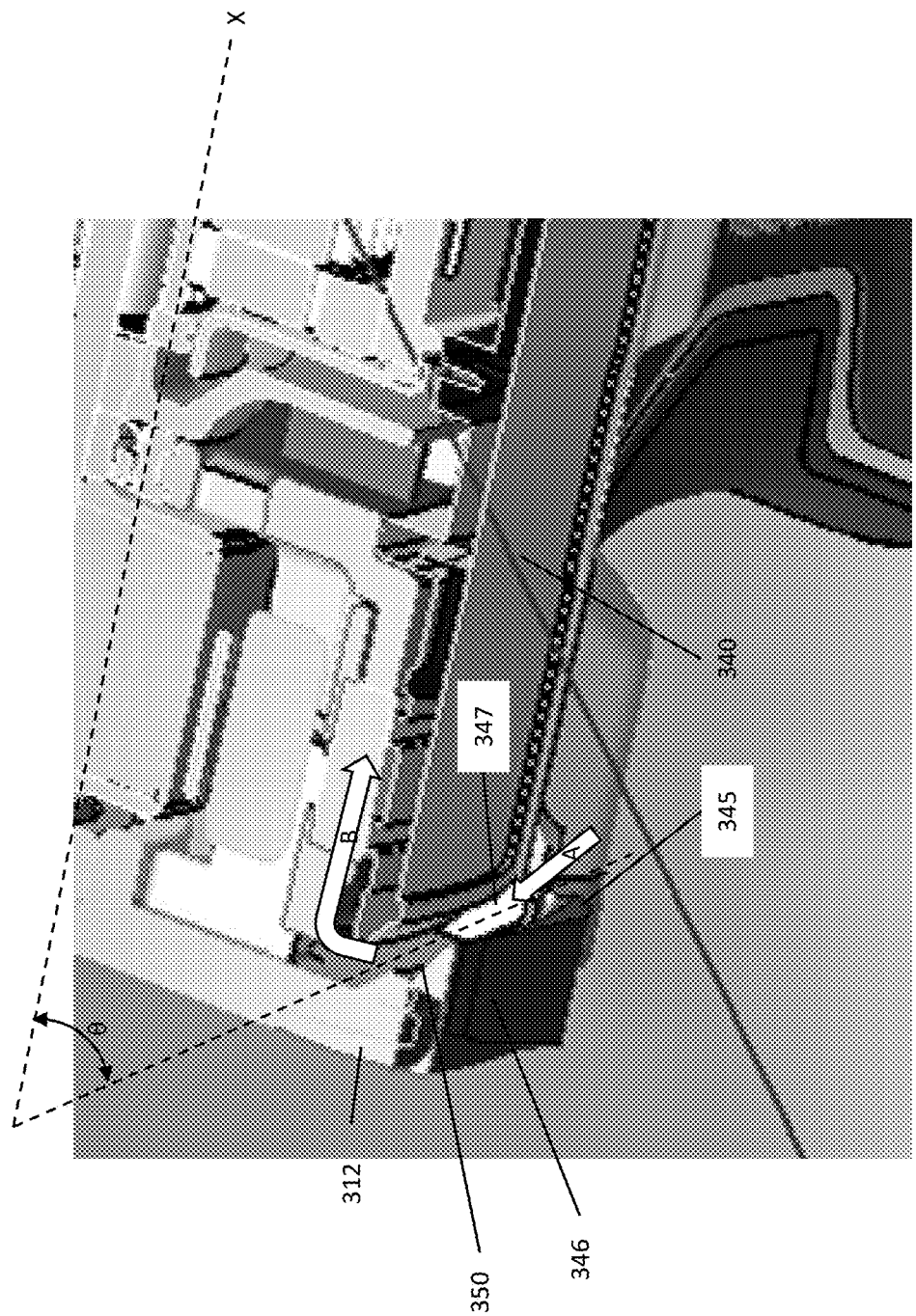
FIG. 17 is a close-up perspective view partially in cross section of a portion of the power tool of FIG. 15.
Figure 18:
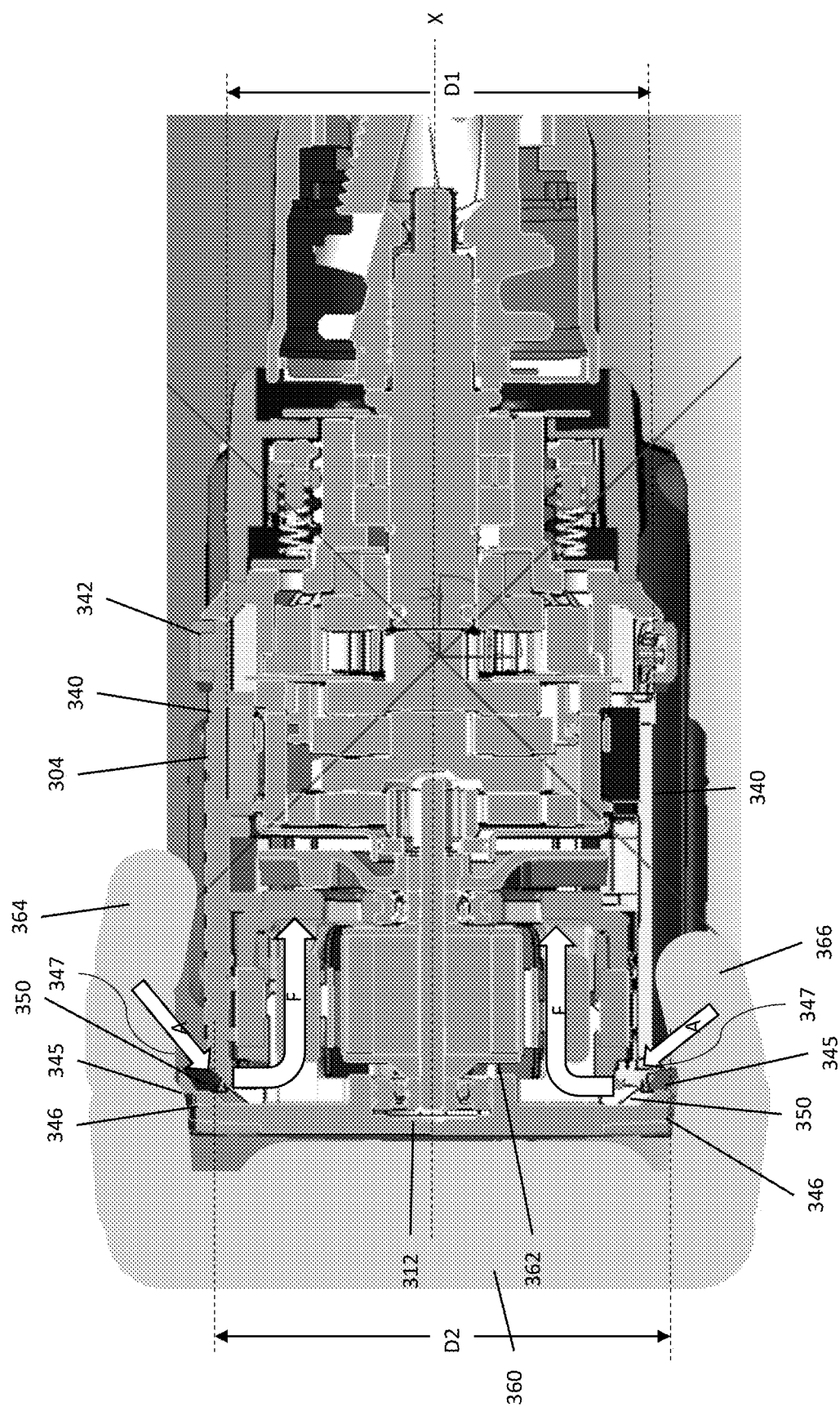
FIG. 18 is a top cross-sectional view of the power tool of FIG. 15.

As shown in FIG. 14, the wings 246 extend radially outward a second distance D2 from the axis X that is greater than the first distance D1 that the side surfaces 240 extend outward from the axis X. This inhibits a user's hand 260 from completely covering the first air intake vents 150 when the tool is being gripped with the palm 262 of the hand 260 on the end cap 212 and the thumb 266 and fingers 264 on the side surfaces 240. The wings 246 also redirect air entering transverse to the axis to be parallel to the axis to flow over and/or through the motor. In addition, the outward projection of the wings 246 together with the bumpers 242 help to prevent direct impact onto the side surfaces 240 of the motor housing in the event the tool is dropped. This helps prevent damage to the housing and its internal components, including the motor.

Referring to FIGS. 15-18, in another embodiment, a power tool 300 (e.g., a drill, an impact driver, or a screwdriver) is similar to power tool 100 described above, with the following differences, where like components have the same reference number starting with "3" instead of "1". The power tool 300 includes a housing 302 including motor housing portion 304 and a transmission housing portion 306 extending along a tool axis X, an end cap 312 coupled to a rear end of the motor housing portion 306, a tool holder 308 (such as a chuck or a quick release tool holder) extending axially forward of the housing 302, and a handle 310 coupled to the housing 302 and extending downward and transverse to the housing 302 along a handle axis Y.

Disposed inside the motor housing portion 304 is a motor 320 (e.g., an electric motor such as a brushless DC motor). The motor 320 includes a stator 322 that is stationary relative to the housing 302 and a rotor 324 that rotates relative to the housing 302 and that drives a motor output shaft 326. Coupled to the front of the rotor 324 is a fan 328 for cooling as described in greater detail below. The output shaft of the motor drives a transmission 330 (e.g., a planetary transmission) that is disposed in the transmission housing portion 306 axially forward of the fan 328. The transmission 330 rotationally drives an output spindle 332, which in turn rotationally drives the tool holder 308. Disposed in the handle is a control board (not shown) similar to control board 134 of the power tool 100.

The housing 302 includes opposed lateral side surfaces 340 separated by a first distance D1. The housing also optionally includes lateral bumpers 342 that extend radially outward from the lateral side surfaces 340. The bumpers 342 help protect the housing 302 and its internal components if the tool is dropped. The rear portion of the motor housing portion 304 is closed by the end cap 312, which may be coupled to the motor housing portion 304 by a plurality of fasteners 344 (e.g., screws or bolts). The end cap 312 includes a pair of lateral wings 346 aligned with the side surfaces and that extend radially outward by a second distance D2 that is greater than the first distance D1. The end cap 312 also includes a pair of lips 345 that extend axially forward from the wings 346 at least partially overlapping the side surfaces of the housing.

The power tool 300 includes a set of first air intake vents 350 at the rear end of the side surfaces 340. The power tool 300 also includes a set of second air intake vents disposed in the battery receptacle or at the bottom of the handle (not shown but similar to the power tool 100). The set of first air intake vents 350 are formed in gaps between the wings 346 of the end cap 312 and the rear end of the side surfaces 340. The first air intake vents 350 are located rearward of the motor 320 and each include an entrance channel 347 defined by the lip 345 at an acute angle θ to the tool axis. Thus, the first air intake vents 350 are oriented at an acute angle to the tool axis so that air flows into the first air intake vents 350 along arrows A at the acute angle and then the end cap redirects the airflow in a direction in a generally opposite direction to air flow across and/or through the motor along arrows F. Air is also able to end the power tool 300 via a third air intake defined as a space 354 between the trigger 314 and the handle 310. A set of exhaust vents 356 are disposed in the side surfaces 340 of the housing 302 forward of the motor 320 and adjacent or in line with the fan 328.

When the fan 328 rotates during motor operation, air enters the housing through the first air intake vents 350 along arrow A. Air also enters the handle through the battery receptacle through the second air intake vents along arrow (similar to arrow B shown in FIG. 1). Air also enters the housing through the space 154 in the trigger 114 along arrow C. The air from the first air intake vents 350 flows over and/or through the motor 320 along arrow F. The air from the second air intake vents flows over the control board and then mixes with the air from first air intake vents 150 to flow over and/or through the motor 302 (similar to airflows E and F shown in FIG. 1). The air from the third air intake space 354 flows over the trigger and then mixes with the air from first air intake vents 150 to flow over and/or through the motor (similar to airflows G and F shown in FIG. 1). All or most of the air that flows over and/or through the motor exits the housing 302 through the exhaust vents 156 along arrows H.

The wings 346 extend radially outward a second distance D2 from the axis X that is greater than the first distance D1 that the side surfaces 340 extend outward from the axis X. This inhibits a user's hand 360 from completely covering the first air intake vents 150 when the tool is being gripped with the palm 362 of the hand 360 on the end cap 312 and the thumb 366 and fingers 364 on the side surfaces 340. The wings 146 also redirect air entering transverse to the axis to be parallel to the axis to flow over and/or through the motor. In addition, the outward projection of the wings 346 together with the bumpers 342 help to prevent direct impact onto the side surfaces 340 of the motor housing in the event the tool is dropped. This helps prevent damage to the housing and its internal components, including the motor.

Figure 19:
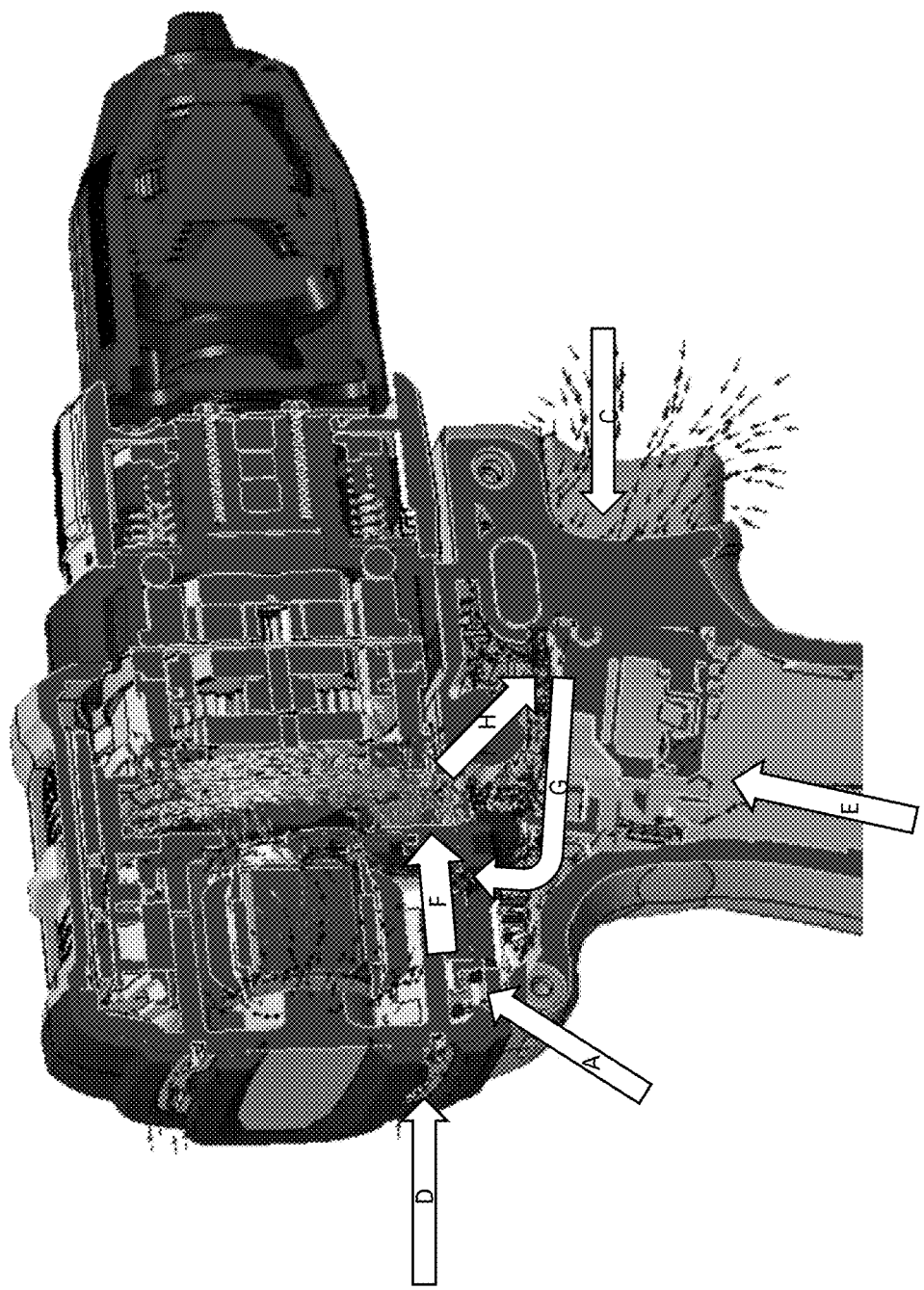
FIG. 19 is a perspective view, partially in section, of an embodiment of a power tool.

Referring also to FIG. 19, in accordance with the above-described examples, at least a majority (e.g., approximately 50% to 75%, such as approximately 60% to 65%) of the airflow enters the housing along arrows A and D through the first air intakes 150, 250, 350 (either only through the first intakes in the embodiments of FIGS. 1-9 and 15-19 or in a combination of the first air intakes 250 and fourth air intakes 258 in the embodiment of FIGS. 10-14, e.g., with about 15% of the airflow through the rear air vents) to cool the motor by flowing in the direction of arrow F to the exhaust vents where the air exits along arrow H. Meanwhile a smaller portion (e.g., approximately 15% to 25%, such as approximately 20%) of the airflow enters the housing through the second air intakes 152, 252, 352 along arrow B, then flows along arrow E to cool the electronics on the control board, and then mixes with the airflow over and through the motor along arrow F to also cool the motor. An even smaller portion (e.g., approximately 5% to 10%) of the airflow enters the housing through the spaces 154, 254, 354 between the trigger and the handle along arrow C to cool the trigger switch and then is redirected along arrow G to mix with the airflow over and/or through the motor to cool the motor. The percentage breakdown of airflow may be configured to correspond to the relative amount of heat generated by each of the components of the power tool.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A power tool comprising:
a housing extending along a tool axis with opposing lateral side surfaces separated by a first distance;
a motor disposed in the housing and including a stator that is stationary relative to the housing, a rotor that rotates relative to the stator, a motor output shaft rotatably driven by the stator, and a fan coupled to the motor output shaft axially forward of the motor;
an end cap coupled to a rear end portion of the housing, the end cap having opposed lateral wings extending radially outward from the side surfaces by a second distance that is greater than the first distance;
at least one first intake vent disposed proximate at least one of the lateral wings and axially rearward of the motor, the air at least one first intake vent oriented transverse to the axis; and
an exhaust vent defined in the housing axially forward of the motor and proximate the fan,
wherein, upon actuation of the motor, air flows into the housing through the at least one first intake vent along a first path, over or through the motor, and out of the exhaust vent, and
wherein the lateral wings are configured to inhibit blockage of the at least one first intake vent.

2. The power tool of claim 1, wherein the lateral wing is configured to inhibit a user's hand from blocking the at least one intake vent when gripping the power tool on the side surfaces.

3. The power tool of claim 1, wherein the at least one first intake vent includes first intake vents proximate each of the lateral wings.

4. The power tool of claim 1, wherein the at least one first intake vent is defined by a gap between the lateral wing of the end cap and the side surface of the housing.

5. The power tool of claim 1, wherein each of the at least one first intake vent is oriented transverse to the tool axis.

6. The power tool of claim 5, wherein each of the at least one first intake vent is oriented orthogonal to the tool axis.

7. The power tool of claim 5, wherein the at least one first intake vent is oriented at an acute angle to the tool axis in a direction opposite the direction of airflow through the tool housing.

8. The power tool of claim 1, further comprising a handle with a first end portion coupled to the housing and a second end portion disposed away from the housing, the second end portion including at least one second intake vent.

9. The power tool of claim 8, further comprising a control board disposed in the handle, wherein upon actuation of the motor, air flows through the at least one intake vent, along a second path over the control board and then mixes with the air from the at least one first intake vent to flow over or through the motor to the exhaust vent.

10. The power tool of claim 9, further comprising a trigger switch coupled to the handle proximately the first end portion with a space defined between the trigger and the handle to form a third intake, wherein upon actuation of the motor, air flows through the third intake along a third path over the trigger switch and then mixes with the air from the at least one first intake vent to flow over or through the motor to the exhaust vent.

11. The power tool of claim 9, further comprising at least one fourth intake vent defined in a rear of the end cap, wherein upon actuation of the motor, air flows along a fourth path through the at least one fourth intake vent, over the control board, and then mixes with the air from the at least one first intake vent to flow over or through the motor to the exhaust vent.

12. The power tool of claim 11, wherein 50% to 75% of air that enters the housing flows through the at least one first intake vent and the at least one fourth intake vent to cool the motor, and 15% to 25% of air that enters the housing flows through the at least one second intake vent to cool the control board.

13. A power tool comprising:
a housing extending along a tool axis with opposing lateral side surfaces;
an end cap coupled to a rear end portion of the housing;
a motor disposed in the housing and including a stator that is stationary relative to the housing, a rotor that rotates relative to the stator, a motor output shaft rotatably driven by the stator, and a fan coupled to the motor output shaft axially forward of the motor;
a handle extending transverse to the housing, the handle having a first end portion coupled to the housing and to a second end portion disposed away from the housing;
a control board disposed in the handle;
at least one first intake vent disposed axially rearward of the motor and between the end cap and the housing;
at least one second intake vent disposed proximate the second end portion of the handle;
an exhaust vent defined in the housing axially forward of the motor and proximate the fan;
wherein, upon actuation of the motor, air flows into the housing through the at least one first intake vent along a first path, over or through the motor, and to the exhaust vent, and air flows into the housing through the at least one second intake vent along a second path over the control board and then mixes with the air from the at least one first intake vent to flow over or through the motor to the exhaust vent.

14. The power tool of claim 13, further comprising a trigger switch coupled to the handle proximate the first end portion with a space defined between the trigger and the handle to form a third intake, wherein upon actuation of the motor, air flows along a third path though the third intake, over the trigger switch, and then mixes with the air from the at least one first air intake vent to flow over or through the motor to the exhaust vent.

15. The power tool of claim 13, further comprising at least one fourth intake vent defined in a rear of the end cap, wherein upon actuation of the motor, air flows along a fourth path over the control board and then mixes with the air from the at least one first intake vent to flow over or through the motor to the at least one exhaust vent.

16. The power tool of claim 13, wherein 50% to 75% of air that enters the housing flows through the at least one first intake vent and the at least one fourth air vent to cool the motor and 15% to 25% of air that enters the housing flows through the at least one second intake vent to cool the control board.

17. The power tool of claim 13, wherein the end cap has opposed lateral wings extending radially outward from the side surfaces by a second distance that is greater than a first distance between the side surfaces.

18. The power tool of claim 13, wherein the lateral wings are configured to redirect airflow from a direction transverse to the axis to a direction along the axis.

19. A power tool comprising:
a housing extending along a tool axis with opposing lateral side surfaces;
an end cap coupled to a rear end portion of the housing;
a motor contained in the housing and including a stator that is stationary relative to the housing, a rotor that rotates relative to the stator, a motor output shaft rotatably driven by the stator, and a fan coupled to the motor output shaft axially forward of the motor;
a handle having a first end coupled to and extending transverse to the housing to a second end portion;
a control board disposed in the handle;
at least one first intake vent disposed axially rearward of the motor proximate the end cap;
at least one second intake vent disposed proximate the second end portion of the handle;
an exhaust vent defined in the housing axially forward of the motor and proximate the fan;
wherein, upon actuation of the motor, approximately 50% to 75% of air that enters the housing flows into the housing through the at least one first intake vent along a first path, over or through the motor, and to the at least one exhaust vent, and approximately 15% to 25% of air that enters the housing flows into the housing through the at least one second intake vent along a second path over the control board and then mixes with the air from the at least one first intake vent to flow over or through the motor to the at least one exhaust vent.

* * * * *